No. 611,387. Patented Sept. 27, 1898.
H. MUELLER.
TAPPING MACHINE.
(Application filed Mar. 14, 1898.)
(No Model.) 2 Sheets—Sheet 1.
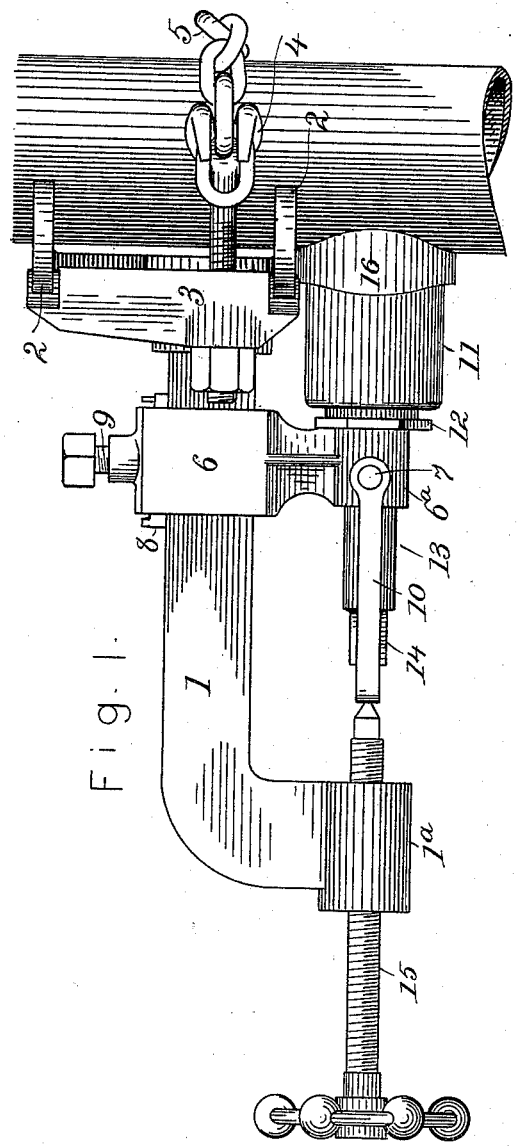
ATTEST
Nora L. Graham.
Ina Graham.
INVENTOR
HENRY MUELLER
By L. P. Graham
his attorney No. 611,387. Patented Sept. 27, 1898.
H. MUELLER.
TAPPING MACHINE.
(Application filed Mar. 14, 1898.)
(No Model.) 2 Sheets—Sheet 2.

ATTEST
Nora L. Graham.
Iva Graham.

INVENTOR
HENRY MUELLER
By L. P. Graham
his attorney

UNITED STATES PATENT OFFICE.

HENRY MUELLER, OF DECATUR, ILLINOIS.

TAPPING-MACHINE.

SPECIFICATION forming part of Letters Patent No. 611,387, dated September 27, 1898.

Application filed March 14, 1898. Serial No. 673,828. (No model.)

*To all whom it may concern:*

Be it known that I, HENRY MUELLER, of the city of Decatur, county of Macon, and State of Illinois, have invented certain new and useful Improvements in Tapping-Machines, of which the following is a specification.

This invention is particularly intended for tapping gas-pipes under pressure. It is exemplified in the structure hereinafter described, and it is defined in the appended claims.

Figure 3:
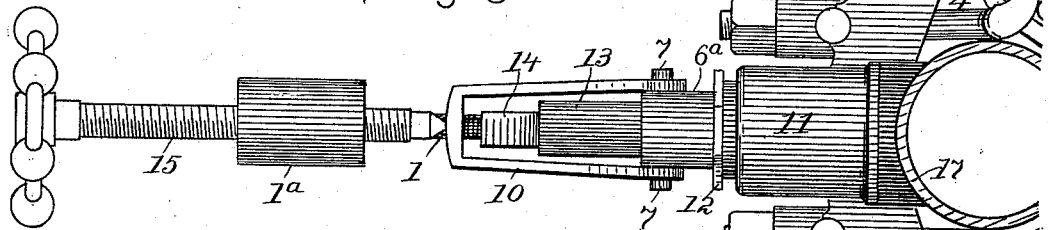
Figure 4:
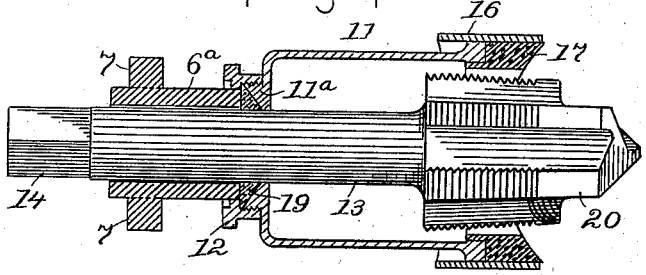
Figure 5:
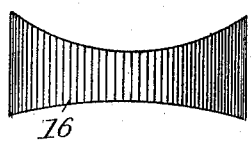
Figure 6:
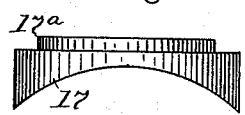
Figure 7:
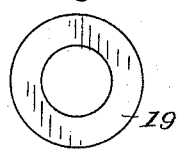
Figure 8:
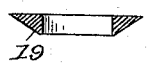

In the drawings forming part of this specification, Figure 1 is a plan of the machine, illustrating the manner in which the closure-cap is forced against the pipe and made to form a gas-tight joint. Fig. 2 is a similar view illustrative of the operation of the machine after connections are properly made. Fig. 3 is a side view of the machine under the conditions illustrated in Fig. 1. Fig. 4 is a central section lengthwise of the closure-cap. Fig. 5 is a side elevation of the confining-band for the saddle gasket or cushion used between the pipe and the closure-cap. Fig. 6 is a side elevation of the saddle-gasket. Fig. 7 is a plan of a packing-washer used to make a tight joint between the closure-cap and the stem of the tapping-tool. Fig. 8 is a diametrical section through the packing-washer.

In constructing a machine in accordance with my invention a hooked or L-shaped bar, as 1, is made, and means are provided for securing the bar to a pipe rigidly and in such manner that its principal member shall extend from the pipe at right angles with the axis thereof. In this instance saddle-bars 2 are fastened to bar 1, blocks 3 are swung in bearings in the saddle-bars, claw-bolts 4 are set into the blocks, and a chain 5 extends from one claw-bolt to the other around the pipe; but this means for connecting the machine to the pipe forms no part of my invention, and it may be varied at will. The hooked member of the bar 1 has a bored and threaded head $1^a$, and through such head a feed-screw 15 extends in a direction parallel with the principal member of the bar. A closure-cap 11 is made with one end entirely open and with the other contracted to conform to the stem of the tapping-tool. Its contracted end is provided with a neck $11^a$, which is beveled internally and threaded externally. A beveled washer 19, of compressible substance, is seated in the beveled neck, and an annular cap 12 is screwed onto the neck and against the outer edge of the washer. A saddle-gasket 17, of rubber or like substance, forms a continuation of the open end of the closure-cap. It has a ledge $17^a$, which fits inside the cap and holds the gasket in place, and it is shaped to conform to the pipe with which the machine is connected.

An arm 6 is mounted slidably on the principal member of bar 1. It extends at right angles therewith, and it has a guide-head $6^a$ for the stem of the tapping-tool. The guide-head is adapted to fit inside cap 12 and bear against washer 19, as shown in Fig. 4, and it has trunnions 7 on its sides. A bail 10 is pivoted on the trunnions of the guide-head, and it is long enough to extend beyond the stem of the tapping-tool when the tool is in position in the closure-cap and inserted through the guide-head, as shown in Figs. 1 and 3. The arm 6 has a key 8, adapted to bear against the rear edge of bar 1, and it also has a set-screw 9, adapted to bear against the key.

A drill and tap is shown at 20, the stem thereof at 13, and the wrench-bearing at 14. The head of a ratchet-wrench is shown at 18 in Fig. 2. A confining-band for the saddle-gasket is shown at 16 in Figs. 1, 4, and 5.

In connecting the machine with a pipe I prefer to first set it upright on the pipe, tighten the fastenings until they are just able to hold the machine extended horizontally, then turn the machine into the horizontal position it usually maintains while in operation, and then draw the holding-bolts as tight as possible. I then tighten set-screw 9, if it is at all loose, and thus fasten arm 6 rigid on the bar 1. This brings the guide-head $6^a$ and the tool therein into accurate alinement with the feed-screw and carries the closure-cap into proper position to be set against the pipe. Next the cap is placed with its gasket bearing firmly against the pipe, the bail is swung in line with the tool-stem, the feed-screw is made to engage a depression in the end of the bail, the set-screw 9 is loosened, and the feed-screw is turned in a direction to force the tool-guide against the closure-cap and the cap against the pipe. This compresses the saddle-gasket and makes it conform to inequalities in the surface of the pipe to an extent to form a gas-tight joint. It also compresses the washer 19 and compels it to closely fit the stem of the tapping-tool, thus preventing gas from escaping through the opening in the cap in which the tool operates. When sufficient pressure is developed by the feed-screw, the set-screw 9 is tightened, and the rigidity of the arm 6 is relied on to maintain the pressure so developed. The feed-screw is then loosened, the bail is swung to one side, as shown in Fig. 2, a ratchet-wrench is set over the square end of the stem of the tool, the feed-screw is turned until its point engages the tool, and the drilling and tapping is performed in the customary manner, but without escape of gas.

A saddle-gasket 17 is made for each material variation in the curvature of the pipes; but all of them are adapted to fit the open end of the closure-cap. It is best to use a special gasket for each of the smaller sizes of pipes, but one will do for several of the larger sizes.

The washer 19 and the seat therefor are preferably made beveled, so that pressure of the washer will force it more directly against the stem of the tool, and it will more quickly and completely relieve the stem when pressure is discontinued; but a plain thick washer will produce the desired result to a limited extent.

When the pressure in the gas-pipe is excessive, a confining-band 16 is used outside the gasket to prevent too much sidewise expansion or displacement. This band is made with one end concaved to form an arc of a circle corresponding with the circumference of a moderately-small pipe, and the other end is concaved to conform to the circumference of a moderately-large pipe. This provision enables one band to be used on all sizes of pipes, as it is not necessary that the band shall precisely fit the pipe to which it is applied.

The key 8 is used in connection with the set-screw 9 in order that the surface of the bar 1 shall not be marred by the set-screw in a manner to interfere with nice adjustment of the arm on the bar. If the set-screw came directly in contact with the bar, it would soon form depressions into which the screw would afterward settle whenever the point struck an edge of a depression, and this might draw the tool-guide away from the cap and diminish pressure to an extent sufficient to permit leakage.

While the machine as a whole is intended for use on gas-pipes, it is not impossible that some of its peculiarities may be applicable to machines for tapping water-mains or for other purposes, and I do not confine its use to the tapping of gas-pipes.

What I claim is—

1. In a tapping-machine, the combination of a closure-cap adapted to contain the tool-head and fit against a pipe, a shiftable tool-guide adapted to bear against the cap on the end opposite the pipe, a bail swung on the tool-guide, a feed-screw adapted to engage the bail and apply pressure to the cap through the tool-guide, and a fastening to hold the tool-guide against the cap and maintain the pressure.

2. In a tapping-machine, the combination of a bar attachable to a pipe at right angles therewith, a feed-screw in an extension of the bar and pointing toward the pipe, a tool-guide shiftable on the bar to and from the pipe, a fastening to secure the tool-guide rigidly on the bar, a closure-cap adapted to fit against a pipe, and a tool-head in the cap with its stem extended through the tool-guide and toward the feed-screw.

3. In a tapping-machine, the combination of a bar attachable to a pipe at right angles therewith, a feed-screw in an extension of the bar and pointing toward the pipe, a tool-guide shiftable on the bar to and from the pipe, a bail swung on the tool-guide, a fastening to secure the tool-guide rigidly on the bar, a closure-cap having a saddle-gasket adapted to fit against a pipe, a tool-head in the cap with its stem extended through the guide and toward the feed-screw, and a compressible washer around the tool-stem between the cap and the tool-guide.

4. In a tapping-machine, the combination of a closure-cap adapted to fit against a pipe at one end and having the other end contracted to fit the stem of a tapping-tool, an externally-threaded and internally-beveled neck formed on the contracted end of the cap, a washer in the beveled portion of the neck, an annular cap screwed onto the neck and engaging the outer edge of the washer, and a tool-guide adapted to bear against the washer inside the cap, substantially as set forth.

In testimony whereof I sign my name in the presence of two subscribing witnesses.

HENRY MUELLER.

Witnesses:
HARRY E. KIZER,
L. P. GRAHAM.